3,403,771
CONTAINER ORIENTING MECHANISM
Ralph G. Gardiner, Santa Clara, and James L. Reimers, San Jose, Calif., assignors to FMC Corporation, San Jose, Calif., a corporation of Delaware
Filed Jan. 5, 1967, Ser. No. 607,489
8 Claims. (Cl. 198—33)

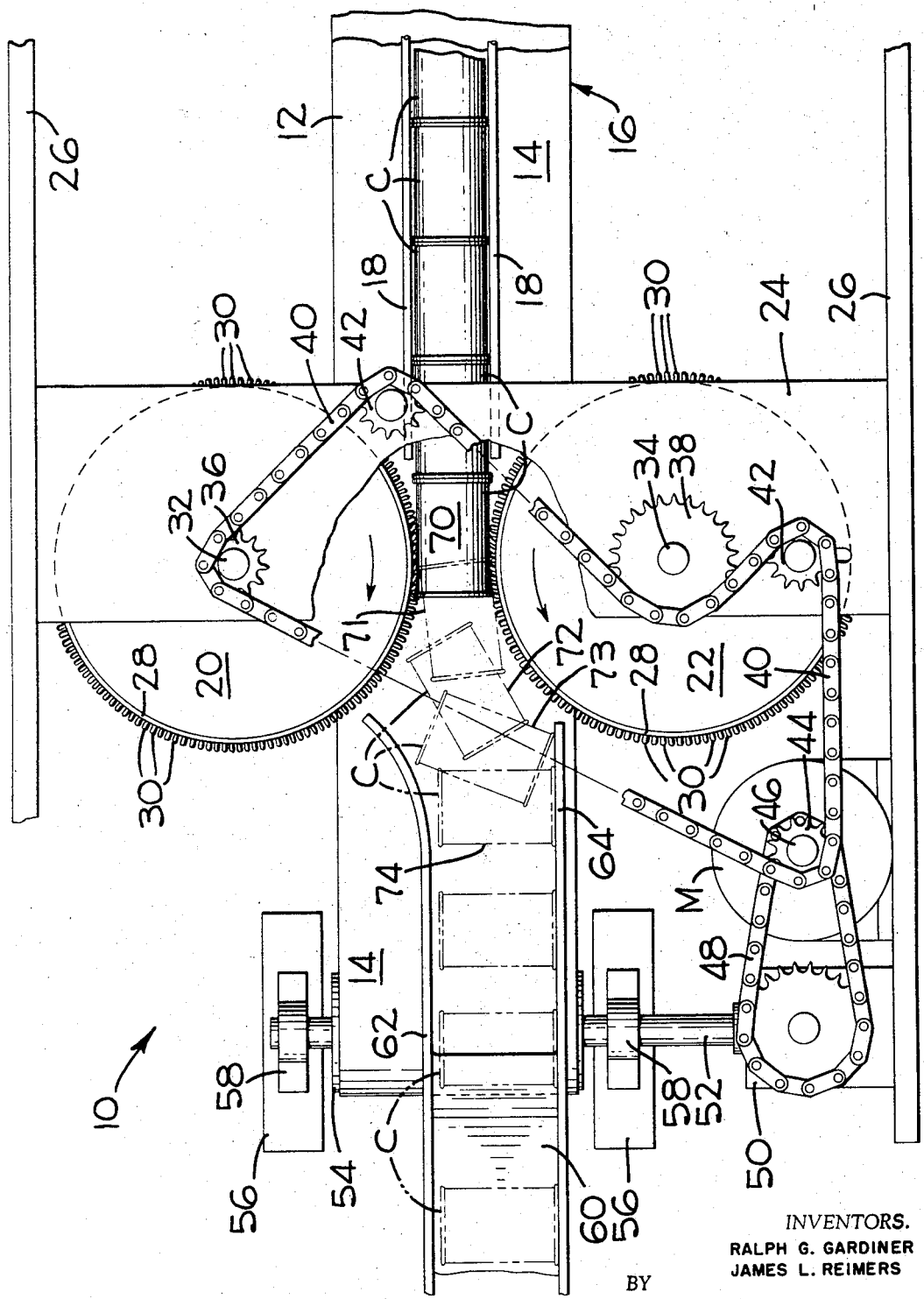

ABSTRACT OF THE DISCLOSURE

A pair of laterally spaced orienting drums having upright axes of rotation and resilient radial fingers are continuously rotated at different speeds. The drums overlie a conveying flight and the fingers grip the walls of containers which are continuously moved endwise by the conveying flight into the space between the drums. Due to the speed differential of the drums, the containers are oriented approximately from endwise into a side-by-side position and progress downstream of the drums upon the same conveying flight.

Background of the invention

The general field of art to which the present invention is directed is in container orienting devices, and more particularly such devices which are associated with high speed continuous processing machines to orient containers either fed to or discharged from the machines.

Prior art devices for carrying out the functions above noted in which cans are oriented from an end to end to a side-by-side orientation, such as in Simpson 3,187,876, may operate at high output rates and with the containers following a horizontal path, but are in general characterized by being somewhat complex and costly. The present invention is directed to the provision of a container orienting mechanism which can operate up to high speeds in excess of 1000 filled containers per minute, which is relatively simple and inexpensive, and which requires no gravity-assist in the orienting operation.

Summary of the invention

The concept embodied in the container orienting mechanism herein disclosed is the provision of differential speed drums which have myriad confronting resilient fingers that cooperatively grip containers delivered endwise between the drums by a horizontal conveying flight. Due to the speed differential between the drums, the containers are rotated approximately 90 degrees into side-by-side instead of endwise positions. To ensure maximum control of such turning action, the conveying flight extends downstream of the drums so that relative motion between the containers and their (conveying flight) support surface is substantially limited to the desired 90 degree rotational movement without producing a rolling motion.

Brief description of the drawing

The accompanying drawing is a fragmentary, diagrammatic plan of a preferred embodiment of the present invention.

Description of the preferred embodiment

The container orienting mechanism 10 may be interposed between any two processing machines, not shown, which respectively deliver and receive cylindrical containers C that must be reoriented from endwise to sidewise positions, and wherein the reorienting must be effected smoothly, positively, and at rates in excess of 1000 containers per minute.

The inlet end 12 of the container orienting mechanism 10 includes the upstream flight 14 of an endless conveyor 16. A pair of guide members 18 guide the containers along a linear path which is straddled by orienting drums 20 and 22. A shelf 24 extends transversely over the belt flight 14 and over the drums 20 and 22 between two support walls 26 which form the major part of the frame of the machine.

The orienting drums 20 and 22 each have vertical walls provided with a rubber facing 28 which is molded with numerous radial fingers 30 to firmly grip the containers C. Drums 20 and 22 are spaced apart a distance such that a container passing between them deflects fingers 30. Means for rotatably mounting the drums 20 and 22 includes stub axles 32 and 34, respectively, that extend upward through the shelf 24 and are continuously rotated at dissimilar speeds in opposite directions so that the confronting peripheral sections of the drums move downstream in timed relation to the belt flight 14. For this purpose the axle 28 is provided with a sprocket 36 which is larger than the pitch diameter of a sprocket 38 that is mounted on the axle 30. A roller chain 40 is trained in opposite directions around the sprockets 36 and 38, around idler sprockets 42, and around a motor sprocket 44 which is mounted on the shaft 46 of an electric motor M.

Also mounted on the motor shaft 46 is a chain and sprocket drive connection 48 to a gear box 50. The gear box is provided with a horizontal output shaft 52 which carries a drive pulley 54 for the endless conveyor 16. Floor-mounted pedestals 56 and bearings 58 rotatably support the pulley shaft 52. The pedestals may also support a gravity chute 60 in can-receiving position relative to the adjacent discharge end of the conveyor 16, and upright container guide walls 62 and 64 that are associated with the dead plate. The upstream end portion of the wall 62 is curved to provide, in conjunction with the linear wall 64, an enlarged entrance throat to restrain the containers while the belt flight 14 carries them toward the dead plate 60. However, the orienting operation is carried out without contact of the containers with the curved wall 62.

While dimensional and speed relations of the described components are obviously governed by the size and weight of the container being handled, one actual embodiment of the invention efficiently functioned at rates up to 500 containers per minute when constructed as follows:

With filled cans about $2^{11}/_{16}$ of an inch in diameter by 4 inches high, the orienting drums 20 and 22 were $15\frac{1}{2}$ inches in diameter. The drum 22 had a peripheral speed of 328 feet per minute and the drum 20 had a peripheral speed of 524 feet per minute. The linear speed of the belt conveyor 16 was 205 feet per minute. It will be noted that the latter speed corresponds to a theoretical input speed of over 600 containers per minute. However, spaces between groups of incoming cans reduced the average throughput to 500 cans per minute.

In operation, the leading full-line container C at 70 is moved by the conveyor flight 14 between the confronting area of the drums and the resilient fingers 30 are flexurally displaced so that each of the many fingers in contact with the container increase their frictional engagement with the container. Consequently, the container 70 is pulled forwardly of the succeeding containers and is skewed about an upright axis as it is thrust through the gap between the orienting drums because the drums rotate at different speeds. The same container at 70 will progressively assume the phantom line positions at 71, 72, 73 and 74, the latter of which is essentially normal to its initial position at 70.

At position 72, the container is free of driving engagement by the orienting drums 20 and 22, but has spinning momentum imparted by the orienting drums. The container rapidly resumes a forward motion approximating the linear speed of the conveying flight 14 because it decelerates after clearing the orienting drums. It has been found that the provision of a moving support for the containers clearing the orienting drums, in this case the belt flight 14 under the containers at positions 72, 73 and 74, provides more uniform spinnning movement of the containers than if a dead plate is used to receive the containers. In other words, there is less relative motion between the containers and their support when the belt flight 14 is used, and this promotes the directional stability of the containers.

Due to the differential speed of the orienting drums 20 and 22, there is a small lateral force component imparted to the containers which deflects the containers from their initial path. Thus, the container at position 73 drifts endwise against the guide wall 64 while turning and moving forward, and the wall provides a fulcrum point which ensures that all containers progressing to and beyond the position at 74 will be accurately aligned. It should be noted that the guide wall 62 does not actively assist in the orienting procedure, but will correct the guide path of any imperfect containers that may deviate from the illustrated path. After the oriented containers progress beyond the position at 74, they may be conveyed to further processing apparatus, such as a labeling machine, by the chute 60.

Although the containers C are herein illustrated as conventional cans with chime ends, the container orienting mechanism 10 will also function with smooth-wall containers, either empty or filled. Also, it can effectively orient containers with rectangular cross-sections. Similarly, the orienting drums 20 and 22 function efficiently with a variety of resilient facing materials other than the fingered type shown, such as sponge rubber or an equivalent foamed plastic. Further possible variants are that with obvious dimensional changes, the orienting action can be reversed so that incoming, rolling containers are reoriented into endwise position; if the incoming containers are spaced apart, the speed differential between the belt flight 14 and the slow speed orienting drum 22 is not necessary, and they can thus have the same (peripheral and linear) speed; it is also possible to have a gravity input chute if the incoming containers are spaced and elevational differences between the inlet and outlet ends of the mechanism are permissible. All of the above changes can be made without impairing the high speed efficiency which is a direct result of the rotary, differential speed orienting drums that eliminate reciprocating parts, star wheels, twisting chutes and the like that are common in prior art devices and limit operational speeds or induce jamming.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. A high speed container orienting mechanism comprising means for conveying a single file of containers along a predetermined path, at least two orienting members rotatable about axes straddling said path, said members having resilient facings with confronting surfaces arranged to simultaneously resiliently grip similarly shaped surfaces of successive containers in said file, means for continuosly driving said members in opposite directions and in differential speed relation so that a cointainer gripped between said member is simultaneously advanced by said members and is pivoted about a pivot axis substantially parallel to said axes, and means arranged to receive the container in an orientation dissimilar to its initial orientation, said differential speed between said orienting members causing each successive container to pivot in the same direction about said pivot axis.

2. Mechanism according to claim 1 wherein said container-receiving means is positioned to arrest pivotal movement of each container, and wherein said direction of pivotal movement is the same as the direction of movement of the slowest driven orienting member.

3. The invention defined in claim 1 wherein said conveying means is a movable conveying means and extends in the direction of container movement downstream beyond said orienting members.

4. The invention defined in claim 1 in which said orienting members are circular drums and said drum facings are provided with radially projecting resilient fingers.

5. The invention defined in claim 4 wherein said conveying means includes a movable conveyor flight and wherein the peripheral speed of the slowest one of said drums exceeds the linear speed of said conveyor flight so that incoming abutting containers are spaced apart by said drums.

6. The apparatus of claim 4 wherein said orienting drums are laterally aligned relative to said predetermined path and said conveying means includes a continuously driven endless conveyor, said latter means including a member having an end portion adjacent said slow speed drum and positioned to arrest a spinning motion of a container discharged from said orienting drums.

7. A high speed container orienting mechanism comprising a driven endless belt conveyor having inlet and outlet ends and arranged to convey a single file of identically oriented abutting containers along a predetermined path, a pair of spaced orienting drums straddling said path intermediate the ends of said conveyor, a said drums having confronting sectors overlying said conveyor, a plurality of resilient fingers radially projecting from each of said drums for resiliently gripping similarly shaped surfaces of successive containers advanced thereto by said conveyor, a power driven train connected to each of said drums for continuously rotating said drums in opposite directions and at different speeds, the peripheral speed of the slower of the two being greater than the lineal speed of said conveyor, and a guide wall overlying said conveyor downstream of said drums for arresting pivotal motion imparted to the containers by said orienting drums, said differential speed between said drums causing each successive container to pivot in the direction of movement of the slow speed drum.

8. A method of pivoting containers moving at high speed through an arc of 90°, comprising the steps of rapidly moving the containers along a predetermined path, resiliently gripping and exerting driving forces on opposite similarly shaped surfaces of one of the containers with the driving force on both of said surfaces causing said one container to accelerate thereby spacing said one container from the next following container, the driving force exerted on one side of said one container being effective to move said one side faster than the other side, releasing said side surface of said one container allowing the container to pivot 90° and supporting and guiding the container in its pivoted position along said predetermined path.

References Cited
UNITED STATES PATENTS 2,758,434  8/1956  Johnson _____ 198—33
3,123,198  3/1964  Hohl _____ 198—33

RICHARD E. AEGERTER, *Primary Examiner,*